BACKGROUND COMPENSATOR FOR FACSIMILE COMMUNICATION SYSTEM

Filed June 7, 1965

INVENTOR.
STEPHEN E. TOWNSEND
BY Stanley Z. Cole
Anthony D. Cennamo
ATTORNEYS

BACKGROUND COMPENSATOR FOR FACSIMILE COMMUNICATION SYSTEM

Filed June 7, 1965

INVENTOR.
STEPHEN E. TOWNSEND

BY Stanley Z. Cole
Anthony D. Cennamo
ATTORNEYS

INVENTOR.
STEPHEN E. TOWNSEND
BY Stanley Z. Cole
Anthony D. Cennamo
ATTORNEYS

INVENTOR.
STEPHEN E. TOWNSEND
BY Stanley Z. Cole
Anthony D. Cennamo
ATTORNEYS

United States Patent Office 3,443,026

Patented May 6, 1969

3,443,026
BACKGROUND COMPENSATOR FOR FACSIMILE COMMUNICATION SYSTEM

Stephen E. Townsend, Rochester, N.Y., assignor to Xerox Corporation, Rochester, N.Y., a corporation of New York Continuation-in-part of application Ser. No. 329,640, Dec. 11, 1963. This application June 7, 1965, Ser. No. 461,693

Int. Cl. H04n 5/38, 7/00; G01j 1/32

U.S. Cl. 178—7.2 3 Claims

ABSTRACT OF THE DISCLOSURE

A facsimile transmitter for transmitting signals representative of intelligence on a document including means for adjusting the intensity of the light source according to changes in the documents background and additional means compensating for the high frequency fluctuations in the intensity of the light source.

This application is a continuation-in-part of my copending application Ser. No. 329,640, filed Dec. 11, 1963 for Facsimile Communication System, now U.S. Patent No. 3,394,222.

In facsimile systems that utilize "flying spot" type of scanning, there is commonly provided a photomultiplier adapted to translate light images from a scanned document into electrical signals. The undesirable characteristic inherent in these systems is that the photomultiplier and the circuits which subsequently convert the signals therefrom into a form suitable for transmission, cannot adequately distinguish between the relatively dark background and the printed intelligence on the material to be transmitted. The presence of a dark background may involve nothing more than colored papers such as those often used in commercial order invoice sets wherein form sheets are color coded for different routing. Often documents to be transmitted may have a white background with colored portions inked thereon, with printed material being present in both the white and colored portions. The inherent characteristics of the "flying spot" type of scanning for facsimile transmission would normally result in the transmission of the darker background as "black" with the resultant loss to the facsimile of the printed material associated with the darker background.

In some cases these systems may be electronically adjusted in order to produce a "white" copy for darker background portions of a document being scanned. Generally however, because of the limitations of the electronic circuits and the optical portions of the facsimile system, the system will still lose some of the printed matter on the darker background, especially in those situations where the image density of the printed matter very nearly resembles the darker background. In addition such systems usually require the continuous attention of an attendant for adjusting the system for each document being transmitted.

In my copending application, Ser. No. 329,640, now U.S. Patent 3,394,222, previously alluded to, there is disclosed a Facsimile Communication System which largely obviates these difficulties inherent in the past art, by the use therein of an automatic level control circuit adapted to convert video signals generated by a photomultiplier into a composite video signal that is binary in character and fully adapted to production of facsimiles representative of the document being scanned. While the circuitry therein disclosed does therefore automatically adjust itself to the varying backgrounds of documents, adequate provision is not made therein for compensating for the high frequency variations commonly present in light sources of the type commonly used in the equipment described. Such variations—which may conveniently be considered under the classifictaion "AC noise"—can for example, be introduced by the irregular nature of the phosphor coating on a CRT face, where that type of instrument comprises the sweeping illuminating source for the document.

It is accordingly a principal object of the present invention to provide a modification for my automatic level controlled facsimile transmitter whereby compensation may be introduced for high frequency fluctuations in the illuminating source of the apparatus.

It is a further object of the present invention to improve facsimile transmission and receiving systems by providing self-regulating circuitry capable of accurately distinguishing between intelligence and background changes.

It is yet a further object of the present invention to minimize the effect of voltage variations and aging in some of the critical components in the system upon the generation or modification of signals within the system that are usable for transmission purposes.

These and other objects of the invention are obtained by means of a second photomultiplier tube which continuously monitors the light output from the flying spot scanner, providing thereby both a high frequency brightness control back to the light source, and a high frequency control component to the noise clipping amplifier.

For a better understanding of the invention as well as of other objects and further features thereof, reference is made to the following detailed description of the invention, to be read in conjunction with the accompanying drawings wherein.

Figure 1:
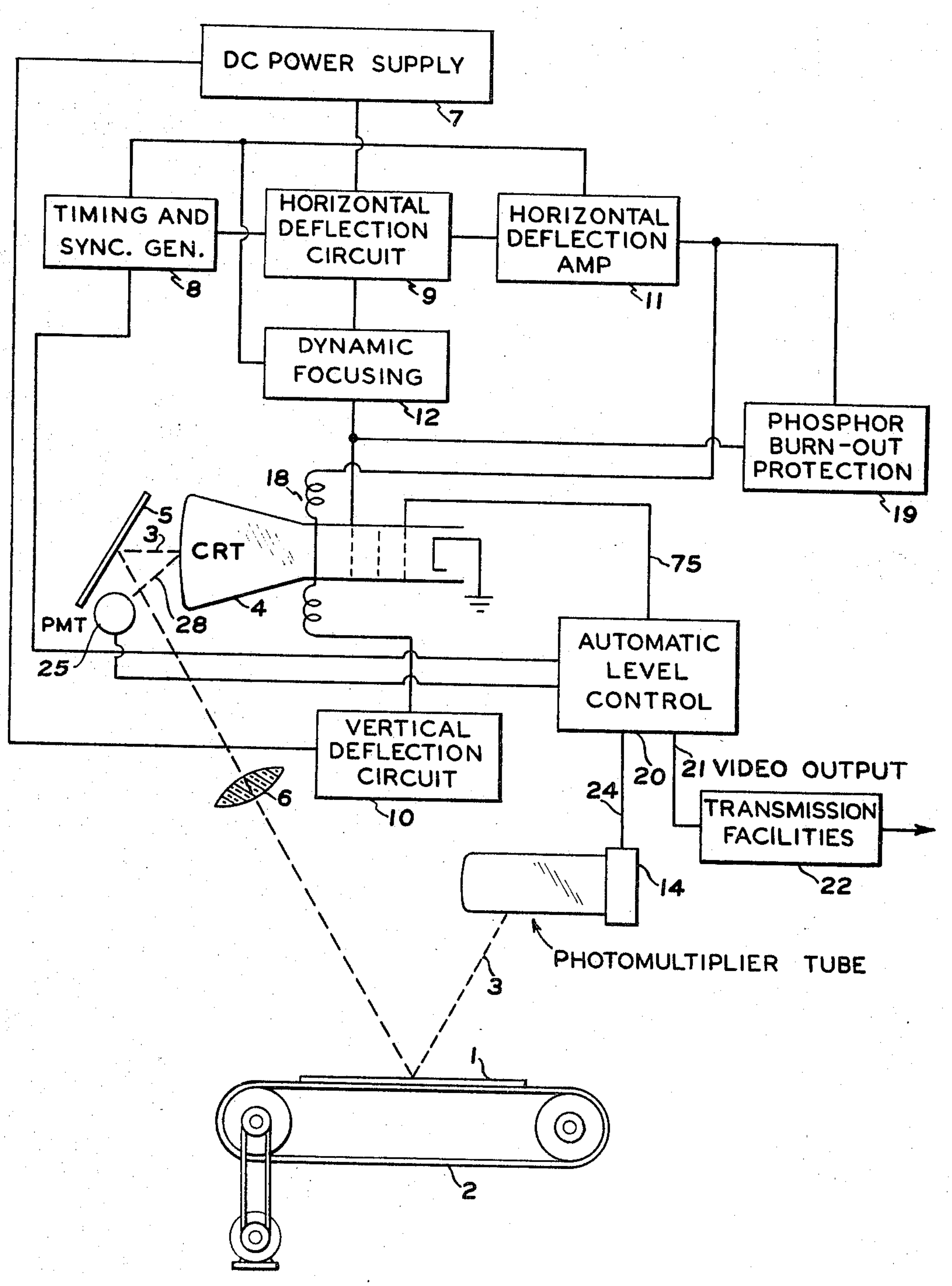
FIG. 1 is a schematic representation of the present invention incorporated into the scanning and transmitting section of a facsimile reproduction system.

In FIG. 1 a schematic representation of a facsimile scanning apparatus of the "flying spot" type, together with its associated transmitting section is shown. A document 1 is moved through a predetermined path at a fixed speed by a conveyor 2 and is scanned by a light beam 3 in a direction perpendicular to the movement of the conveyor. The light beam originates in a cathode ray tube 4, hereinafter referred to as CRT, and is reflected off a mirror 5 to a lens 6 and onto the surface of the document 1.

A direct current power supply 7 wherein normal line voltage is converted to various levels of DC voltage supplies power to a timing and sync generator 8, a horizontal deflection circuit 9, a vertical deflection circuit 10, a horizontal deflection amplifier 11, and dynamic focusing circuit 12. Additional power supplies—such as a negative supply for the photomultiplier tubes 14 and 25, and screen, high voltage, and bias supplies for the CRT 4—are for purposes of simplicity not shown, but may take any of the conventional forms well known in the art.

The timing and sync generator 8 may be of any conventional construction; it emits a pulse which regulates the operation of the horizontal deflection circuit 9, and a sync burst which is subsequently inserted into the video signal for transmission to the receiving unit. The signal output of the horizontal deflection circuit 9 is amplified by the deflection amplifier 11 and fed to the deflection yoke 18 for the CRT 4. The vertical deflection circuit 10 is provided to control the vertical location of the light spot in the CRT 4. The light spot is not normally deflected in a vertical direction and the CRT could be operated without the vertical deflection circuit. However, the vertical deflection is provided to allow the light spot to be moved up or down on the face of the CRT and thus vary the location of the scan line on the tube face. After a period of operation the phosphor on the tube face wears out from repeated use along a scan line. The operator may adjust the vertical deflection, thus producing a new scan line on the tube face and physically move the tube in the opposite direction to maintain the scan line in the same relative position with respect to the document to be scanned.

Phosphor burn-out protection is also provided at 19 between the deflection yoke 18 and the high voltage supply (not shown). The function of the phosphor burn-out protection is to insure that the high voltage supply will be cut off from the CRT if, for any reason, the sweep of the light spot fails. Thus, rather than having one bright spot on a tube face that could burn out the phosphor, the power producing the spot is cut off, protecting the phosphor.

When the light beam 3 scans document 1, light is reflected from the document along path 3A to the photomultiplier tube 14. The photomultiplier translates the reflected light from the document into an electrical signal which is amplified and modified, as will be presently described, in the automatic level control 20. The automatic level control also receives the sync burst and a blanking signal from the timing and sync generator 8 and inserts these into the output video signal. The composite signal is then sent directly to the receiving unit, or sent by line 21 to a suitable transmission terminal facility generally indicated by the numeral 22.

While all the elements thus far alluded to in FIG. 1 are substantially the same as those described in my referenced copending application Ser. No. 329,640, now U.S. Patent 3,394,222, it will now be seen that a second photomultiplier tube, designated generally by the numeral 25, has been located adjacent the reflecting mirror 5 and positioned to intercept portions of the light directly emanating from CRT 4. This is illustrated by the representative light path 28. The output of this second photomultiplier tube is conducted to automatic level control 20 for purposes to be more fully elucidated below.

Figure 2:
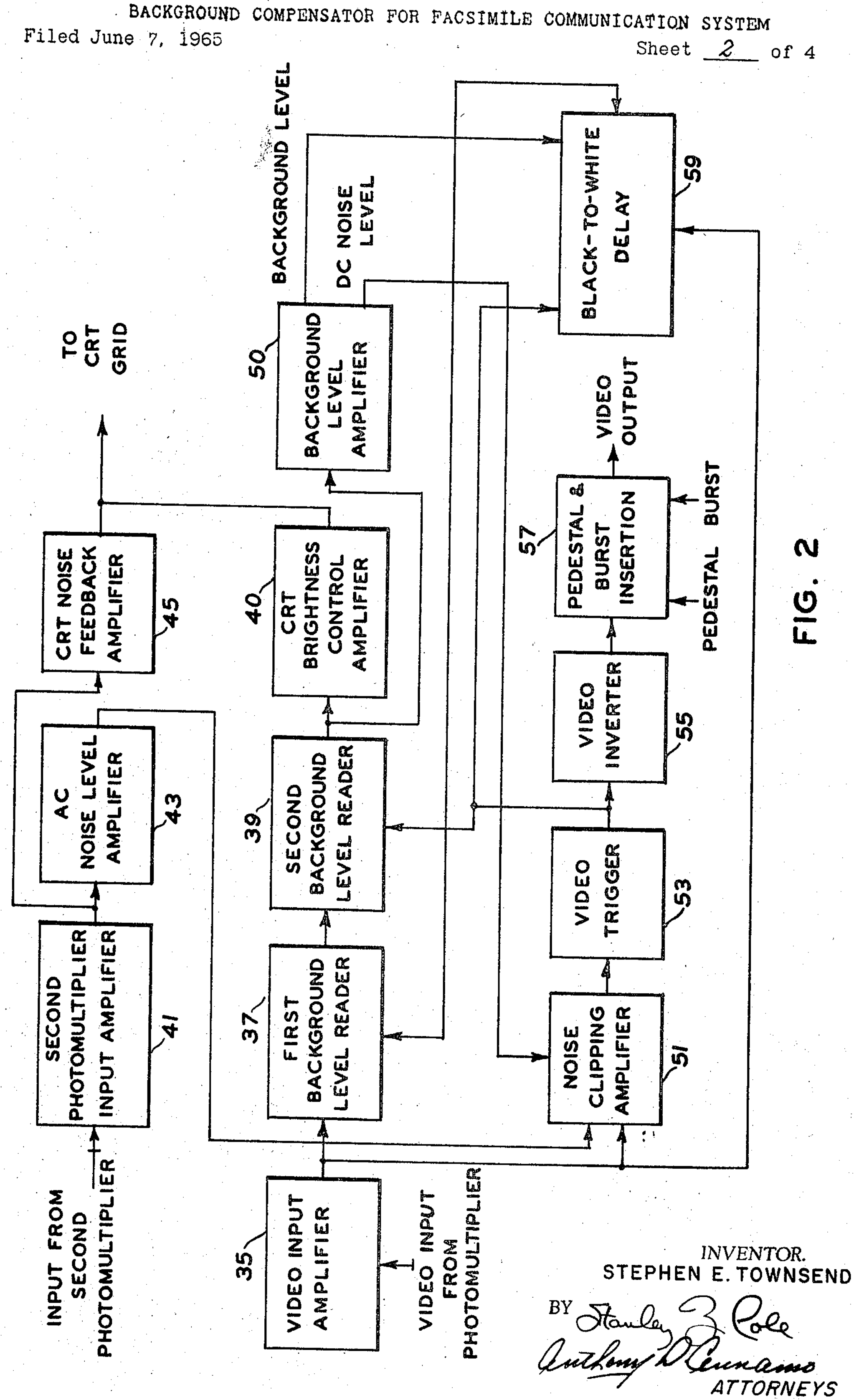
FIG. 2 is a schematic representation in the form of a block diagram of the automatic level control portion of the present invention.

The general operation of the present invention may best be understood by referring to the block diagram shown in FIG. 2. As is there shown, the video output from the photomultiplier tube 14 is passed through the video input amplifier and then takes one of two major routes. The first is through the two background level readers 37 and 39 which act to measure and store the voltages of the parts of the waveform being designated as background. This measured background voltage operates the CRT brightness control amplifier 40 which in turn feeds a signal via conductor 75 to the CRT grid whereby the brightness of the CRT is varied as to maintain the background voltage at a constant level.

The second major route of the video signal is through the noise clipping amplifier 51. Fed into the noise clipping amplifier simultaneously with the video signal is the AC noise level output from amplifier 43 and the DC noise level output from background amplifier 50. The AC output, as will be more fully described later, originates from the second photomultiplier 25 and principally represents variations in the light output of the CRT spot due to phosphor noise and/or variations in dynamic focusing characteristics of the CRT. The DC output, of course, represents at any given moment the light reflecting characteristic of the document background. The noise clipping amplifier 51 allows only that portion of the video signal which extends more positive than the composite AC and DC noise level to be amplified and thereafter fed to the video trigger 53. The video trigger 53 then converts the analogue video signal to a binary signal into which is gated at 57 the blanking pedestal and sync burst to form the composite video output. A video inverter 55 is provided between the video trigger 53 and the pedestal and burst insertion circuits at 57, whereby it is possible to selectively invert the video signal in the transmitter output so that the transmitted signal may selectively represent white on a black background or black on a white background, regardless of the sense of the input document.

The input from the second photomultiplier 25, after passing through the amplifier 41, is also fed via the noise feedback amplifier 45 directly to the CRT grid to constitute a negative feedback loop which regulates and levels high frequency variations in the light output of the CRT.

The black to white delay circuitry within block 59 supplies control inputs to the background level readers 37 and 39, which control signals are principally functions of the signal output from the video trigger 53. The purpose of these control inputs is to vary the capability of the background readers to follow changes in the document background. So, for example, where the video trigger "identifies" an area on the document as "black" (i.e. "intelligence"), the black to white circuitry supplies a control input which effectively clamps the background readers at the last background level determined.

The manner in which the present invention functions to achieve the effects just outlined, and the specific circuitry that accomplishes such functions, is largely disclosed in my copending application Ser. No. 329,640, now U.S. Patent 3,394,222, previously alluded to. An examination of the disclosure therein contained will reveal that it differs principally from the present specification in the absence of the second photomultiplier—designated in the present FIG. 1 by the numeral 25—and in the absence of the attendant circuitry represented in FIG. 2 by elements 41, 43 and 45.

As has already been indicated, the second photomultiplier—designated by the numeral 25 in FIG. 1—is positioned in such a manner that it is affected only by light originating at the CRT face. That is to say, it is not in any way influenced by portions of the light reflected off the document 5. The phosphor noise and/or other AC noise present in the light output of the CRT is accordingly picked up by the second photomultiplier and amplified by the input amplifier 41. Thereafter, a portion of this amplifier signal is fed via conductor 61 to the CRT noise feedback amplifier 45. The resulting negative feedback from this latter amplifier is then fed to the CRT grid whereby reduction of the objectionable AC noise is achieved.

Figure 3:
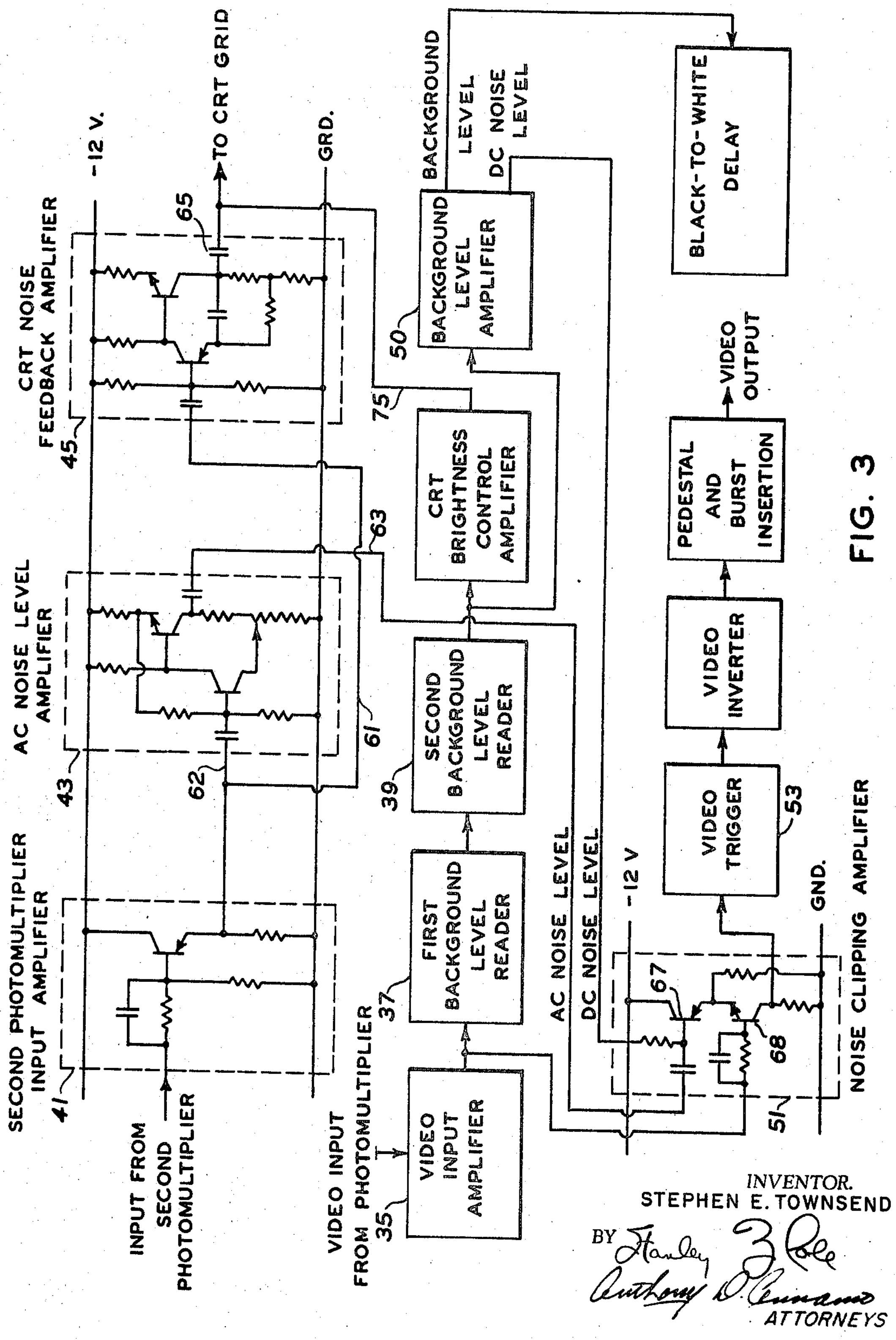
FIG. 3 is similar to FIG. 2, but reveals in detail the circuitry of selected portions thereof.

It will be appreciated by those skilled in the art that the addition of the circuitry associated with the second photomultiplier—that is those portions of FIG. 3 corresponding to blocks 41, 43 and 45—has not been without its effect upon the background level readers. These background level readers, in the absence of the additional circuitry cited, have the capability of adjusting CRT brightness within a fraction of the scan period. In fact, these background level readers are specifically designed to have either a long or short discharge time constant, specifically depending upon whether the video trigger circuitry at 53 has previously "judged" the input video signal to represent "black" or "white." The two time constants are about 30 sweep times for black and 0.02 sweep time for white. This is all fully discussed in my copending application Ser. No. 329,640, now U.S. Patent 3,394,222. The effect of adding the new elements associated with the second photomultiplier is, among other things, to effectively increase the discharge time constant associated with the background level readers. This will be apparent from the consideration that capacitor 65 in the CRT noise feedback amplifier section 45 has in itself a 10 microfarad capacity. The net effect of the additional capacitance is to somewhat override the rapid reaction capability of the background level readers so that the readers are, in effect, now averaging the background over the order of approximately 10 scan lines.

This modification of the background level reader performance is far from being an incidental result. For it has been found that the circuitry shown in my copending application Ser. No. 329,640, now U.S. Patent 3,394,222 has in one respect worked less than satisfactorily. In particular, it was found with that system that when scanning a line that was approximately horizontal, the CRT spot would not as a rule cleanly engage the line at its end, travel its length, and cleanly leave its other end to produce an idealized long rectangular video pulse. Rather, the spot would approach and leave the line at a narrow angle, producing a video pulse with quite a long rise and fall time. Given this sort of video input, the system of 329,640, now U.S. Patent 3,394,222 treated it in exactly the same manner that it would treat a slow change in CRT light output, a non-linearity in the optical system, or a gradual change in the background. That is to say the system tended to readjust the CRT brightness in an attempt to illuminate the gradual darkening. In some cases this type of reaction could even cause loss of recognition of these horizontal lines in the system video output. Thus it is that the capacitive effect of the additional circuitry associated with the second photomultiplier, as a result of which the fast response feature of the background level readers is somewhat overriden, serves to remove the difficulties associated with horizontal line scanning. This of course, is above and beyond the previously noted use of this circuitry to minimize high frequency fluctuations in the CRT spot.

As has been previously mentioned, the second photomultiplier 25 also serves to correct light changes due to imperfect dynamic focus of the CRT. It should be pointed out here that in the circuitry disclosed in my copending application Ser. No. 329,640, now U.S. Patent 3,394,222, this type of light variation was continuously corrected for by the fast acting background control loop associated with the background level readers. But, as has been indicated in the preceding paragraph, the response of the background level readers has been somewhat slowed in order to eliminate the horizontal line scanning problem. Thus, in the present invention, the second photomultiplier circuitry has completely taken over this function.

Figure 4:
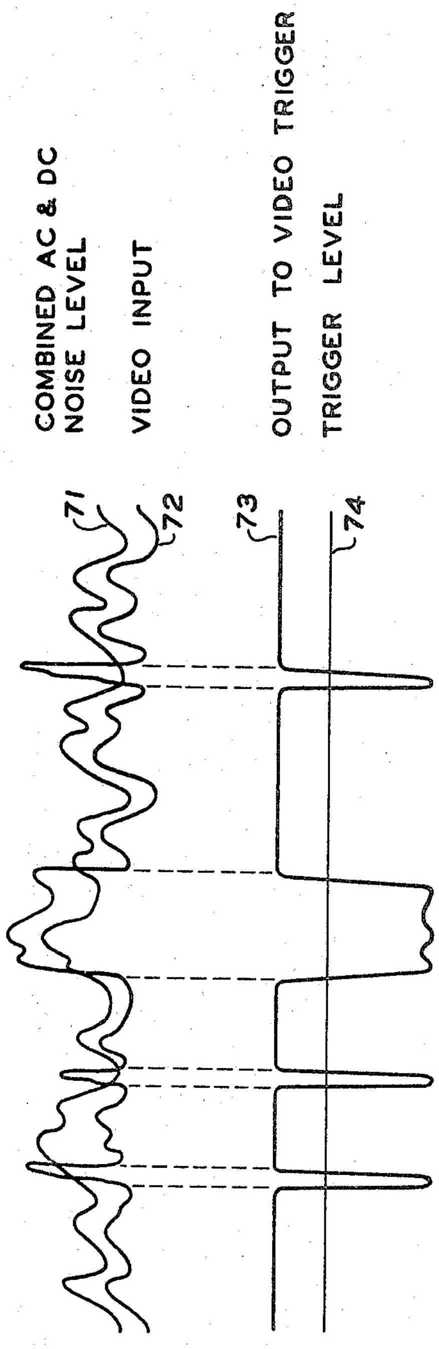
FIG. 4 is a graphic representation of the waveforms present at the noise clipping amplifier section of the automatic level control of FIG. 2.

In addition to noise reduction by feedback, a portion of the high frequency AC noise is fed via conductor 62 to the AC noise level amplifier 43. The amplified AC signal is then fed via conductor 63 to the noise clipping amplifier 51. The AC signal is there combined with the DC noise level emanating from background level amplifier 50. This combined AC and DC noise level is fed through the emitter follower 67 to the emitter of transistor 68. At the same time the video input from amplifier 35 is applied to the base of transistor 68 with the result that any time the video waveform goes more positive than the combined AC and DC noise level, transistor 68 will be turned on, producing an output pulse to the video trigger 53. Waveforms illustrating this action are shown in FIG. 4. In that figure, 72 represents the video input signal from video input amplifier 35, 71 represents the combined AC and DC noise level, and 74 is the trigger level of video trigger 53. 73 then shows the output from transistor 68 to the video trigger circuit 53. From this point one, the further processing of the signal, its transmission to the receiver, and its use to reconstruct a facsimile copy of the original document, are exactly as disclosed in my copending application Ser. No. 329,640, now U.S. Patent 3,394,222. Accordingly, that application should be referred to for further details of these functions.

While the present invention has been described in terms of a specific embodiment, it will be appreciated by those skilled in the art that numerous modifications thereof and variations thereupon may now be constructed without departing from the essential nature of the present disclosure. The invention is therefore to be broadly construed and limited only by the claims now appended hereto.

In the claims:

1. A transmitting unit for a facsimile communications system, capable of transmitting signals representative of intelligence on a document a facsimile of which is to be transmitted, comprising:

(a) image scanning means to scan successive line paths across the said document and produce electrical signals in accordance with the reflective characteristics of intelligence and of background contained thereon, said image scanning means including an intensity-variable light source for illuminating said document;

(b) electrical signal-producing, light sensitive means positioned to monitor the light intensity of said light source;

(c) first circuit means coupled between said light sensitive means and said light source to produce an opposing feedback signal to said light source in response to high frequency fluctuations in said intensity of said source, whereby said fluctuations are decreased;

(d) second circuit means for receiving said signals from said image scanning means and for producing a voltage that is indicative of the light reflective characteristics ofthe background of said document;

(e) third circuit means coupled to said second circuit means and responsive to the voltage produced thereby for varying the illumination provided to said background by said light source in response to variations in the said reflective characteristics of the said background;

(f) fourth circuit means coupled to said image scanning means to said light sensitive means, and to said second circuit means for determining the parts of said electrical signals from said image scanning means which are indicative of intelligence on said document;

(g) fifth circuit means coupled to said fourth circuit means to produce a two-level signal in response to the output of said fourth circuit means, one of said levels being indicative of background on said document, and the other of said levels being indicative of intelligence on said document; and (h) means for transmitting said two-level signal output to a receiving unit.

2. Apparatus according to claim 1 wherein said light sensitive means comprises a photomultiplier tube, and saidf light source comprises a cathode ray tube.

3. In a facsimile communication system for transmitting signals representative of the light reflective values of intelligence on a document a facsimile of which is to be transmitted, comprising a transmitting unit having an image scanning device adapted to scan successive line paths across the document and including a light source for illuminating said document, means for producing an analogue video signal in accordance with the light reflective values of the intelligence and of the background on the document during each scan of said scanning device, first circuit means for distinguishing the signal pulses in the video signal that are representative of intelligence from the background level that is indicative of the background of the document, second circuit means coupled to said first circuit means and said image scanning device for varying the illumination of the background in response to variations in the background level from lighter to darker backgrounds and from darker to lighter backgrounds, third circuit means connected to the first circuit means for producing a first noise level from said background level, fourth circuit means adapted to receive the video signal and the first noise clipping level from said third circuit means for clipping noise from the said video signal, fifth circuit means connected to said fourth circuit means to convert said clipped video signal to a binary signal, sixth circuit means for introducing blanking and synchronizing components into the said binary signal derived from said fifth circuit means for deriving a composite video signal, and means for transmitting said composite video signal to a receiving unit, said receiving unit including means for reconstituting the composite video signal into a visual image of the intelligence on the document, the improvement comprising:

(a) a photosensitive means positioned to monitor the light intensity of said light source and produce an electrical signal indicative of said intensity;

(b) a seventh circuit means coupled between said photosensitive means and said light source to produce an opposing feed-back signal to said source in response to high frequency variations in said intensity whereby said variations are lessened; and (c) circuit means to couple high frequency variations in said electrical signal produced by said photosensitive means to said fourth circuit means whereby the said noise clipping action of the said fourth circuit means occurs at a level determined by both the said first noise clipping level and the said high frequency variations in said electrical signals.

References Cited

UNITED STATES PATENTS

| | | | |
|---|---|---|---|
| 3,265,812 | 8/1966 | Essinger | 178—7.2 |
| 3,379,826 | 4/1968 | Gray | 178—6 |

ROBERT L. GRIFFIN, *Primary Examiner.*

J. A. ORSINO, Jr., *Assistant Examiner.*

U.S. Cl. X. R.

178—6.8; 250—205, 217

PO-1050
(5/69)

UNITED STATES PATENT OFFICE
CERTIFICATE OF CORRECTION

Patent No. 3,443,026 Dated May 6, 1969

Inventor(s) Stephen E. Townsend

It is certified that error appears in the above-identified patent and that said Letters Patent are hereby corrected as shown below:

Column 6, line 17, before "source" insert --light--; column 6, line 45, delete "saidf" and insert --said--.

SIGNED AND
SEALED
AUG 26 1969

(SEAL)
Attest:

Edward M. Fletcher, Jr.
Attesting Officer

WILLIAM E. SCHUYLER, JR.
Commissioner of Patents